Nov. 17, 1936.   G. C. WOODRUFF   2,061,495
METHOD OF LOADING, TRANSPORTING, AND UNLOADING BRICK, OR LIKE COMMODITIES
Filed March 21, 1935   5 Sheets-Sheet 1
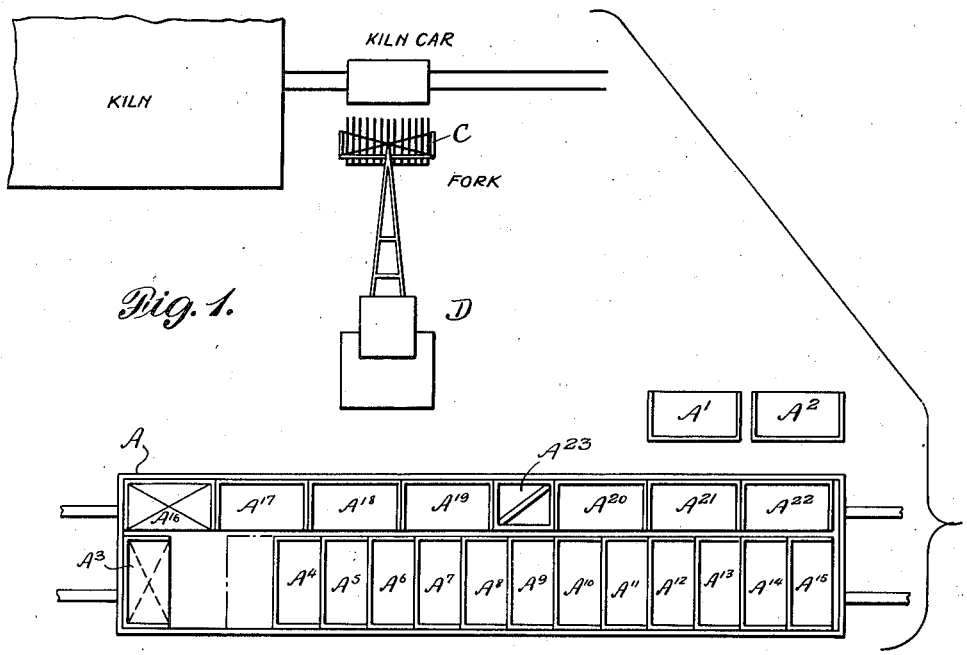
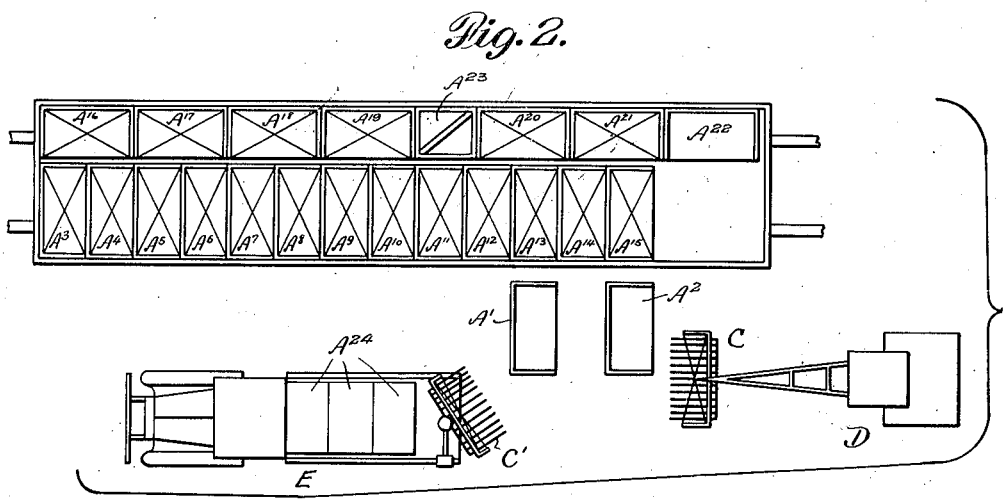
INVENTOR
Graham C. Woodruff
BY
ATTORNEY Nov. 17, 1936. G. C. WOODRUFF 2,061,495
METHOD OF LOADING, TRANSPORTING, AND UNLOADING BRICK, OR LIKE COMMODITIES
Filed March 21, 1935 5 Sheets-Sheet 3

INVENTOR
Graham C. Woodruff
BY
ATTORNEY

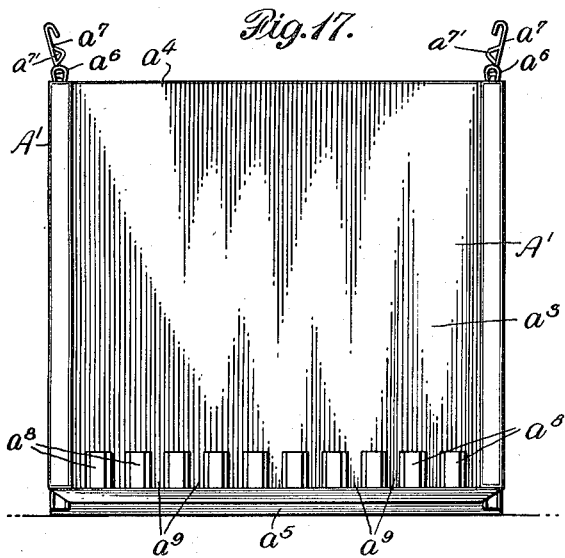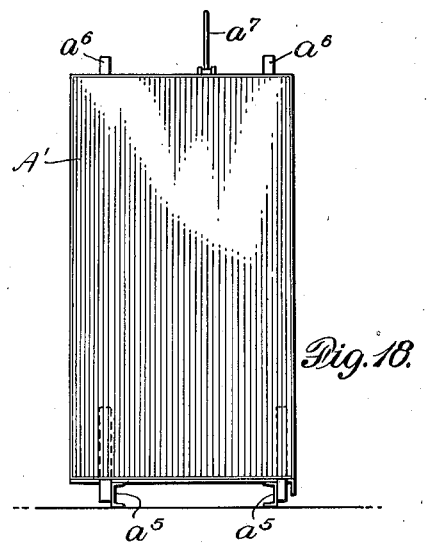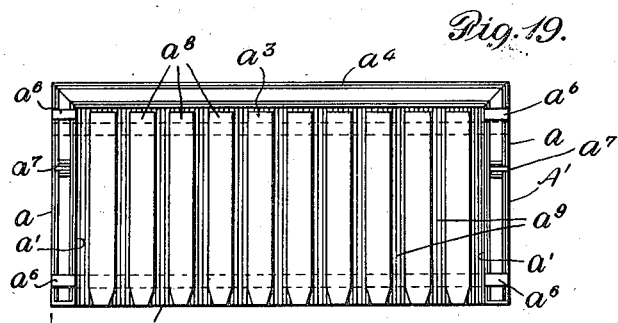

Nov. 17, 1936.                G. C. WOODRUFF                 2,061,495
METHOD OF LOADING, TRANSPORTING, AND UNLOADING BRICK, OR LIKE COMMODITIES
                         Filed March 21, 1935          5 Sheets-Sheet 5
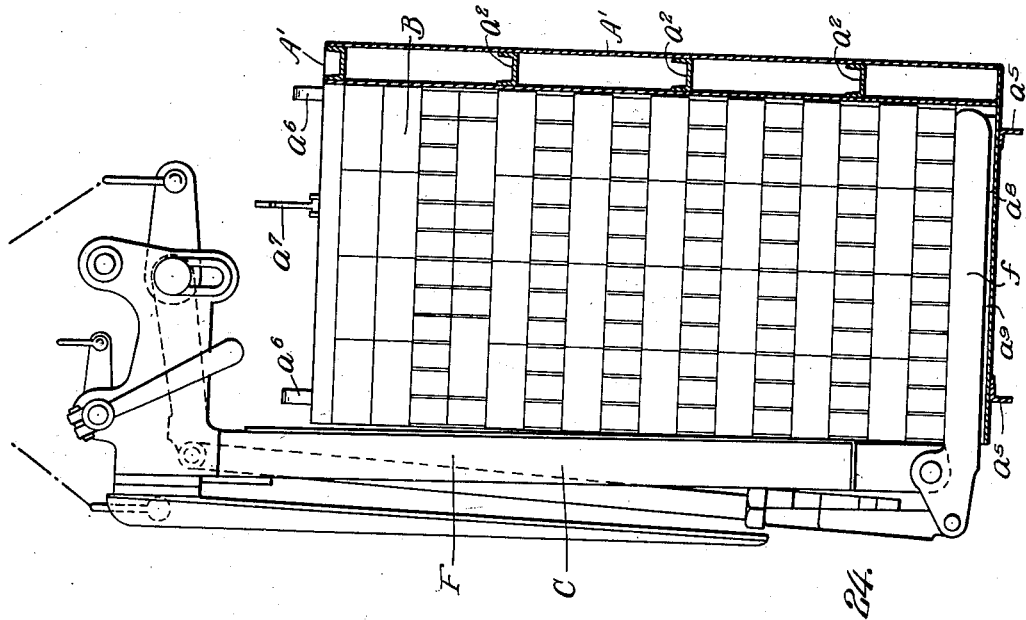
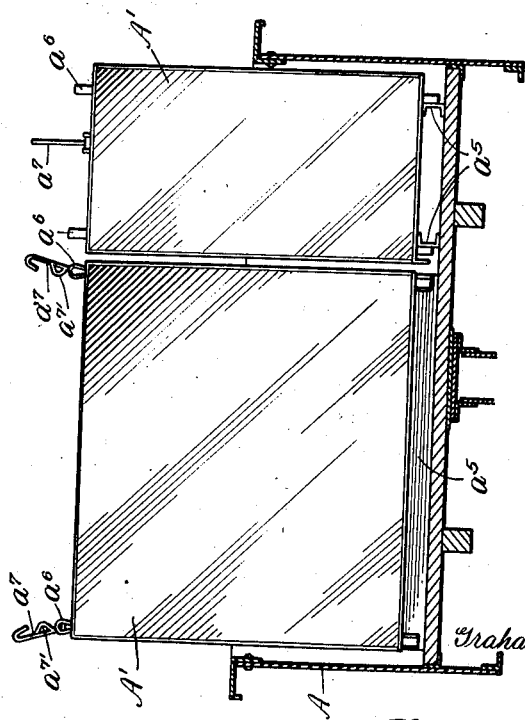
Inventor
Graham C. Woodruff Patented Nov. 17, 1936

2,061,495

UNITED STATES PATENT OFFICE 2,061,495

METHOD OF LOADING, TRANSPORTING, AND UNLOADING BRICK, OR LIKE COMMODITIES

Graham C. Woodruff, Bronxville, N. Y., assignor to The L. C. L. Corporation, a corporation of Delaware Application March 21, 1935, Serial No. 12,294

7 Claims. (Cl. 214—152)

This invention relates to a new and improved method of and means for loading, transporting and unloading brick or other like commodities which are commonly transported in large quantities at a time in railway cars or other transport vehicles.

One object of the invention is to provide a method whereby a quantity of brick in tier or stack form may be loaded as a unit, transported with other like units, and unloaded as a unit, so that the original stack or tier form of the unit may be preserved and delivered in such form at a destination point.

A further object of the invention is to provide a novel method whereby stack or tier units of brick or the like may be stored in unit containers for transportation in container freight cars, so that the stack or tier units may be kept in separated condition and from relative movement, shifting or collapse during transportation on the car.

A still further object of the invention is to provide a novel method of loading, transporting and unloading brick in stack or tier form, whereby the brick in tier or stack form as it comes from a drying kiln may be directly loaded in the unit containers for transport in a container car to a destination point for removal and disposition in stack form until their use is desired for building construction or other purpose.

A still further object of the invention is to provide a method whereby such stack or tier units of brick or other articles may be loaded into containers on a container car and unloaded therefrom into containers on another transport vehicle in a ready, convenient and time saving manner.

A still further object of the invention is to provide a method whereby brick or other commodities in stack or tier units may be loaded, transported and unloaded with a material saving of time and labor over prior methods, without liability of fracture or other damage to the bricks and so as to avoid the losses resulting therefrom, and in such manner as to effect great economy in handling and transporting the brick and in enabling a greater quantity of brick to be carried at a time on a container car or other carrier vehicle.

A still further object of the invention is to provide a novel construction of means or instrumentalities, including a novel construction of container, for carrying the method into practice.

With these and other objects in view, the invention consists in the method, and steps of the method, hereinafter more fully described and claimed, reference being had to the accompanying drawings illustrating one way of carrying the method into practical effect, and in which:—

Fig. 1 is a group plan view showing a container car in process of being loaded at a brick kiln.

Fig. 2 is a similar view showing a container car in process of being unloaded at an unloading point.

Figure 3:
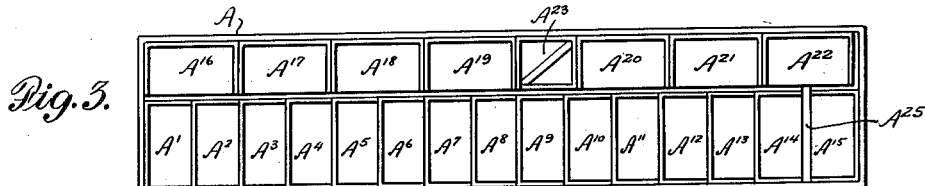

Figs. 3 to 10, inclusive, are diagrammatic plan views illustrating step by step one way according to my method of loading the material on a container car for transport, and Figs. 11 to 16, inclusive, are similar views showing another way according to my method of loading the material on a container car.

Fig. 17 is a front elevation of one of the containers.

Fig. 18 is an end elevation thereof.

Fig. 19 is a top plan view of the container.

Fig. 20 is a cross-section through the container.

Figs. 21 and 22 are detail views showing the construction of the lifting links and hooks on a container.

Fig. 23 is a transverse section through the car showing the arrangement of containers of the longitudinal and transverse sets therein.

Fig. 24 is a sectional view through a container showing in side elevation the lifting fork and illustrating its application in applying a stack of brick to or removing a stack from the container.

In the drawings I have shown the use of individual lot or unit containers of suitable construction in connection with a freight car of gondola type, although it is to be understood that my invention is not intended to be restricted in use to a car of this type, as in practice, and within the scope of the appended claims, other types of cars may be employed. In the drawings, for clarity of illustration, I have also indicated by full crossed diagonal lines (X) those containers on or off the car which have been filled and by similar broken lines the next container or containers in order to be filled, the absence of such lines indicating empty containers.

Referring now more particularly to the drawings, A designates a freight car of the type described which may be of a size to hold any desired number of individual freight containers of a predetermined size and capacity, that shown in the present instance for purpose of exemplification being of a size to hold twenty-two containers of a certain capacity arranged in a specified manner therein, the containers being designated by the reference characters A' to A²², inclusive. The containers may vary in size and capacity according to the character of freight to be shipped. In the shipment of brick each container may advantageously and conveniently be of a size for holding a stack or tier of approximately 1500 brick, piled for example in the way brick are commonly piled on a kiln truck for the drying and curing of green brick in a drying kiln, but in the shipment of brick as well as other articles or materials the size and capacity of each container may be that best adapted for the particular purpose.

Each container $A'$—$A^{22}$ comprises a body, preferably of oblong rectangular form, and having a bottom wall or floor structure, a rear wall and two end walls, said rear and end walls being made of spaced outer and inner sheets $a$, $a'$ connected and held spaced by channeled or other suitably shaped spacing and stiffening members $a^2$. The container as thus constructed is open at its front $a^3$ and its top $a^4$ and is provided at its bottom with supporting members or feet $a^5$ for supporting the container upon the floor of the car and which are adapted to serve as skids or runners on which the container may be slidably shifted in the car. The end walls of the container are provided, at the top and near the corners of the container, with lifting links $a^6$ for connection with the sling of a crane, whereby the container may be swung into and out of the car and otherwise manipulated. The end walls of the container are also provided with pivotally mounted lifting hooks $a^7$ for engagement with a lifting fork for a similar purpose. Each of these hooks may advantageously be provided with an abutment projection $a^{7\prime}$ for the purpose of preventing any possibility of the stacked load catching on the hooks proper, when being lifted from the container by the fork, in cases where a hook has not been thrown back to the dotted non-interfering position from the full line position shown in Fig. 22. Assuming for example that any hook has not been thrown back to a non-interfering position, but remains in the interfering position shown in full lines in Fig. 22, it will be thrown back into the clear when the upper tier of brick in the stack contacts the under or sloping side of the projection $a^{7\prime}$ as the load is being lifted vertically from the container. The projection $a^{7\prime}$ does not come into play when a stack of brick is being lowered into the container, as under these conditions the hook if not thrown back out of the way will contact the underside of the lifting fork without tendency to disrupt the stack. The bottom and body walls of the container may be made of sheet steel of proper kind and gage and properly stiffened to provide a container of maximum strength and durability. The open-front and open-topped chamber of the container is adapted to receive freight or lading to be transported, herein shown in the form of a stack or tier unit B of brick. As stated, the bricks composing this stack or tier may be laid upon one another in the manner in which green brick are placed in tier or stack form on a kiln truck for drying or curing treatment in a brick kiln. The upper surfaces of the bottom of the container are provided with a series of upstanding supporting and guiding cleats or ribs $a^8$ on which the stacks of brick rest and whereby the lowermost bricks of the stack are held elevated and spaced from the bottom of the container. These cleats or ribs serve also as guide members and are properly spaced to form guideways or channels $a^9$ for the reception and movement of the fingers or tines of the lifting fork in the operation of the fork in loading a stack of brick into a container and unloading the same therefrom. The cleats or ribs may be made of wood or other suitable material. Instead of forming the container with a solid bottom wall, a perforate type of bottom may be used, i. e., one in which the cleats $a^8$ rest on metal supports spaced or otherwise constructed or arranged to leave the spaces between the cleats themselves and the cleats and the side walls open to allow broken brick and other refuse to drop through instead of accumulating in said spaces.

For the purpose of conveniently carrying out the loading and unloading operations in accordance with my invention, and enabling the loaded containers to be transported in a ready and convenient manner and without injury to their contents, the containers are purposely arranged in two groups, sets or series within the container car A, the containers $A'$—$A^{15}$ being arranged at one side of the car, transversely of the car, and in abutting relation from end to end of the car, while the containers $A^{16}$—$A^{22}$ are arranged at the opposite side of the car and longitudinally of the car in abutting relation. As shown in the present instance, the relative dimensions of the car and containers are such that the containers may be compactly stored in this manner and in abutting relation with the exception that, as the longitudinally extending series of containers may not completely fill the car from end to end thereof, a spacing element $A^{23}$ of suitable type may be centrally or otherwise suitably arranged to fill or take up the unoccupied space. The dimensions of the containers also are or may be such that each container is of a length or distance between its ends double its breadth or distance between its front and back, so that each pair of containers of the transversely arranged series will take up the same longitudinal distance or amount of space in the car as one of the longitudinally extending containers, thus allowing the transversely extending containers to be arranged in one of many possible ways to form a front or retaining wall for the load in the longitudinally extending containers and said transversely extending containers to be shifted in a certain manner to freely expose them and the longitudinally extending containers for loading and unloading actions, as hereinafter described. However, I do not limit the invention to such form and dimensions of the containers, or to their particular arrangements disclosed for purposes of exemplification, except when specifically defined in the appended claims, as, within the broad scope of my invention, various modifications in these respects may be made without departing from the principle of the invention. It is to be understood that the dimensions of the containers may be such that two or more containers of the transversely arranged row or series will form the front or retaining wall for the load in each longitudinally extending container, thus making it necessary to shift the transverse containers to freely expose the open sides of the longitudinally extending containers for the loading and unloading operations.

In order that the exemplified loading and unloading actions and manner in which the stacks of brick are stored in the car for transportation may be readily understood, I have shown in Fig. 1 a car arranged in position to be loaded with stacks of brick as the stacks are withdrawn from the kiln, and I have shown in Fig. 2 a car arranged for the unloading of the filled containers from the car to an automobile truck or similar vehicle constructed for the purpose. As shown in Fig. 1, the stack of brick is adapted to be lifted from the indicated kiln car after it is run out of the kiln by means of the lifting fork C attached to an overhead or portable crane D and swung around and loaded into a container arranged in the car or upon the ground as the case may be, while in Fig. 2 I have shown a car arranged at a delivery point and in process of being unloaded, at which point there is provided a crane D with lifting fork C of either of the types previously described for the unloading of the brick from the car and at which delivery point is also shown a highway transport vehicle E, onto which the brick are to be loaded for transportation to a final destination point. This highway transport vehicle may be provided with a body of special construction designed to receive containers $A^{24}$ of the same size and capacity of the railway car containers or otherwise suitably constructed to accommodate the brick in stacks as removed from the car containers, which truck E is equipped with a lifting fork C' and suitable lifting means for transferring the loaded containers or stacked brick from the containers on the truck body to the ground or a platform at the destination point. With this arrangement of handling means the brick will be unloaded from the car containers and loaded into the truck containers by the lifting fork C of the crane D and transferred and unloaded from the truck containers or truck body at the final destination point by the fork C' and lifting means on the truck.

The exemplified manner in which the brick are loaded upon the car A at the loading point and unloaded from the car at the delivery point will now be fully described, reference being had in this particular connection first to Figs. 3 to 10, inclusive, and then to Figs. 11 to 16, inclusive, of the drawings.

Figure 4:
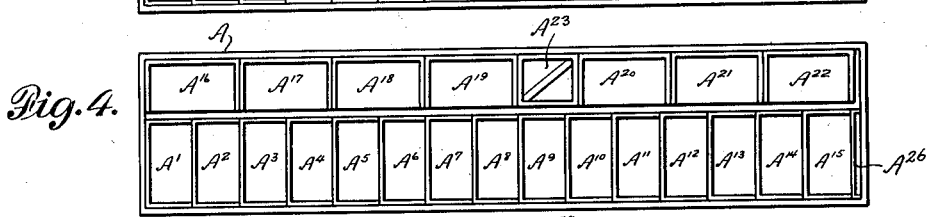

Figs. 3 and 4, in which the disclosure is essentially the same but differs in a certain respect hereinafter noted, show the normal condition of a fully unloaded container car in which the containers $A'—A^{22}$, inclusive, are arranged. In loading the containers they are, with certain exceptions, loaded by means of the fork C while on the car and unloaded, with certain exceptions, by means of the fork C while on the car, the exceptions being the removal of two of the containers or the necessary number of containers to permit shifting of the transversely disposed containers longitudinally on the car to expose the open fronts of the containers $A^{16}—A^{22}$ and the open fronts of the remaining transversely disposed containers on the car in regular order to permit them to be filled or to be loaded and unloaded in a convenient, rapid and time saving manner.

Figure 5:
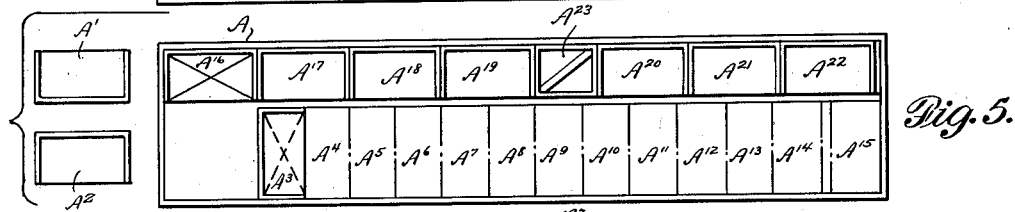
Figure 6:
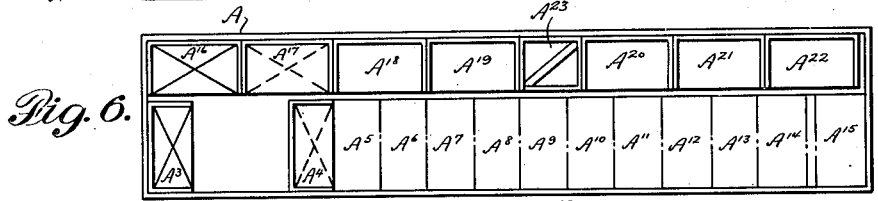
Figure 7:
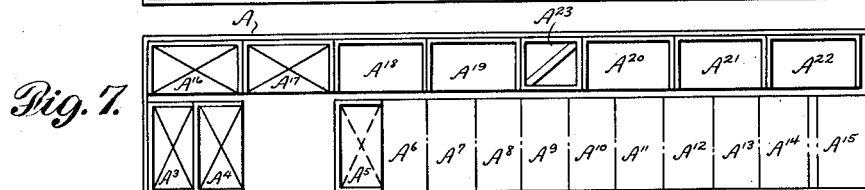
Figure 8:
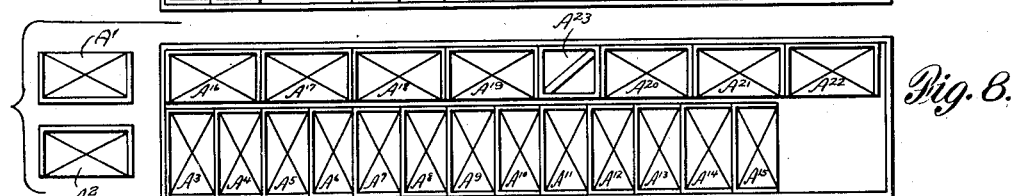
Figures 9, 10:
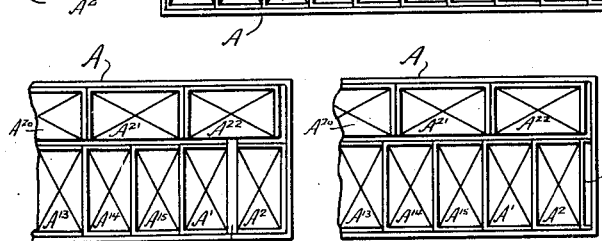
Figure 11:
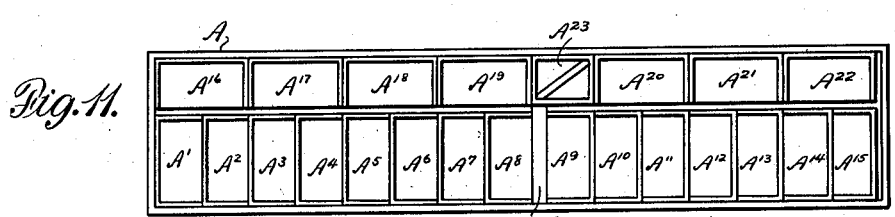
Figure 12:
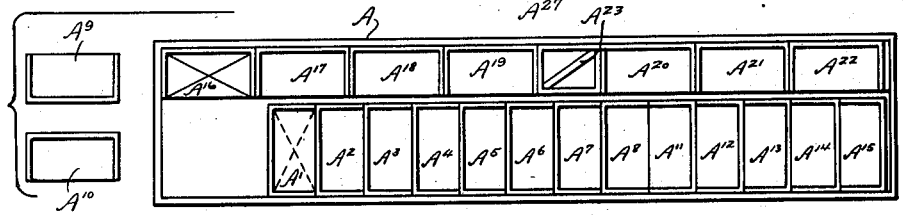
Figure 13:
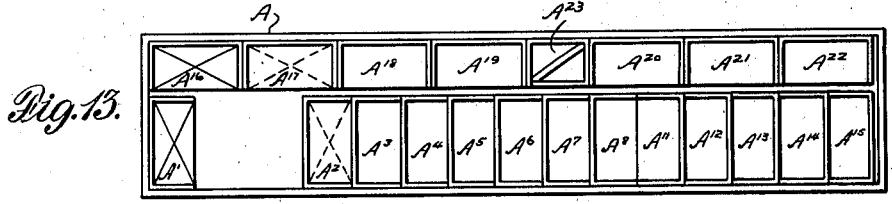
Figure 14:
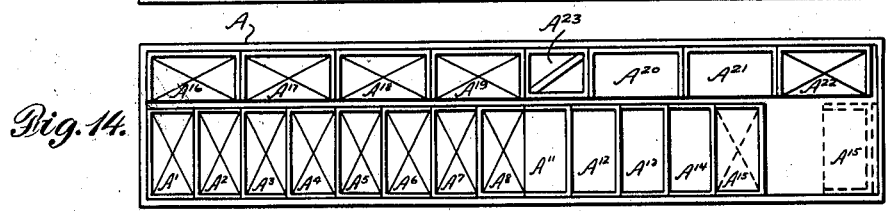
Figure 15:
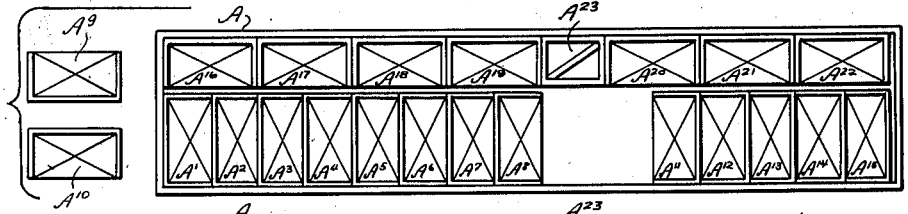
Figure 16:
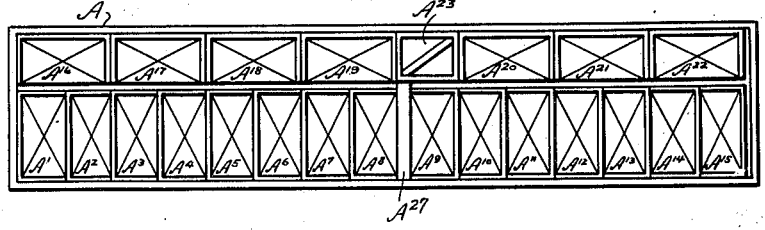

Fig. 5 shows the first step in the loading operation, which involves the removal of the first two transverse containers A', $A^2$ and the placing of these containers at a convenient point on the ground, in order that the open side of the first container at one end of the longitudinal series of containers may be exposed for the reception of the load and a space provided in the car in front thereof to permit entrance of the fork into and its withdrawal from the car in the loading action. Upon the removal of the containers A', $A^2$ the first stack or tier of brick is loaded into the container $A^{16}$, after which the container $A^3$ or the first adjacent end container of the transverse series is shifted toward the adjacent end of the car to provide a space between it and the container $A^4$ for the entrance and withdrawal of the fork, whereupon said container is filled, these operations being clearly indicated in Figs. 5 and 6. After the container $A^3$ is filled, container $A^4$ is shifted to close the open side of the container $A^3$, as shown in Fig. 7, and to provide a fork receiving space between it and the container $A^5$, and said container $A^4$ is then loaded or filled. The shifting of container $A^4$ to loading position, as shown in Fig. 7, thereby brings the two containers $A^3$, $A^4$ in position to fully close the open side of the container $A^{16}$, to expose the open side of the container $A^{17}$ and to provide a fork receiving space between the containers $A^4$ and $A^5$, whereupon container $A^4$ is loaded. These operations of shifting containers of the transverse series for loading the same and the containers of the longitudinal series are carried out in the manner described up to a point where all the containers except the last two of the transverse series are loaded and positioned in the car as indicated by Fig. 8. Containers A', $A^2$ are then filled while on the ground and lifted into position on the car by means of the overhead or portable crane, the position of container $A^2$ being reversed so that the open side of this container is adjacent to or faces the open side of container A', between which a removable separator plate $A^{25}$ is then placed, as shown in Fig. 9, in order to separate and prevent intermeshing of the loads. An alternate arrangement for placing the last two containers of the transverse series on the car is shown in Fig. 10, in which the open side of the container $A^2$ is arranged to face in the same direction as the other transverse containers, or toward the adjacent end wall of the car, in which case a removable bulkhead $A^{26}$ is inserted between this container and the end of the car body for retaining the load in position. When the car is thus completely loaded, the containers will be compactly arranged and the open side of each container will be closed by an adjacent container or containers, whereby the containers themselves are prevented from having any shifting movements in the car and the stacks of brick in the containers are prevented from shifting or the bricks therein being broken or otherwise damaged.

It will be understood, however, that instead of employing the particular loading method disclosed in Figs. 3 to 10, inclusive, as above described, any other mode of loading and giving an equivalent result may be employed. I have shown, for example, in Figs. 11 to 16, inclusive, another mode of loading which may be employed as one of many possible modes. The loading method above described and shown in Figs. 1 to 10, inclusive, starts with the removal of the two left hand containers A', $A^2$ of the transverse series of containers, but, as shown in Figs. 11 to 16, inclusive, the unloading method may start with the removal of the containers $A^9$, $A^{10}$, in which event all the empty containers $A'—A^8$ are shifted to the right to expose the container $A^{16}$ for a loading action, and then the containers $A'—A^8$, $A^{17}—A^{19}$ are loaded in the same manner as described with reference to Figs. 3 to 10, inclusive, completing the loading operation up to the point where the positions of the transverse containers are reversed, whereupon the containers $A^{11}—A^{15}$ are shifted to the left to expose the container $A^{22}$ for a loading action, and after this container is loaded the containers $A^{15}—A^{11}$, $A^{21}$ and $A^{20}$ are loaded in a manner readily understood from the preceding description and the containers A⁹, A¹⁰ loaded, if not previously loaded, and lifted into the car between containers A⁸ and A¹¹, a separator plate A²⁷ being placed between the containers A⁸, A⁹ to separate and prevent intermeshing of the loads therein.

With the method of loading disclosed in Figs. 3 to 10, inclusive, all the containers of the transverse series, or all of them with the exception of an end container, may be arranged to face in the same direction from end to end of the car, while with the method of loading disclosed in Figs. 11 to 16, inclusive, the transverse containers may be arranged in sets facing in opposite directions from the point where the loading operation is initiated by removal of two containers, both modes allowing convenient shifting and loading actions according to the point of removal of the two displaced containers.

In the operation of unloading a container car, the last two loaded containers placed in position on the car in the loading action are first removed and lifted from the car and deposited on the ground by the overhead or portable crane, and the unloading operation of the remaining containers is then proceeded with in reverse order to the loading steps as described in connection with the base arrangements disclosed respectively in Figs. 1 to 10, inclusive, and Figs. 11 to 16, inclusive, the overhead or portable crane being employed to transfer the stacked bricks from the containers to the ground, or to a loading platform or to containers on the highway transport vehicle or to the body of said vehicle, according to the disposition to be made of the stacks of brick at the time and their points of destination. It will be understood, of course, that the loaded containers as removed from the car and deposited upon the ground or platform may be unloaded immediately on their removal from the car or at any time desired during the operation of unloading the car, and when all the containers on the car are unloaded the containers in question are again restored to initial position on the car. The brick of course may be directly unloaded at a brickyard or building site where the brick are to be stored or used in building operations. Fig. 2 shows an unloading crane at the delivery point which may be used for any of these purposes and also shows a highway truck arranged in position to be loaded with the brick in the event that the brick are to be transported from the car A on reaching a delivery point to a destination point by means of a second transport vehicle. This second transport vehicle or truck may be provided with a special framework on the truck body for supporting a lifting and traveling mechanism to which the lifting fork is attached, and which mechanism may be of the general type disclosed or of any other suitable for the purpose.

This method of loading, transporting and unloading brick and other materials which are transported distances not only adapts a stack composed of a number of the brick or articles to be loaded and unloaded from the transport vehicle in each loading and unloading step, but also provides for the maintenance of the brick in stack form and their delivery in such form at the final destination or delivery point, as well as their support and protection against shifting and injury during transport, thus not only saving time and labor in the handling of the material but also losses caused ordinarily by damage of the material during transit, so that great economy in the shipment of articles of this character is obtained. The method is of particular value in the shipment of brick, since the brick, which is stacked when in a green state for burning in a kiln may be directly taken, when burned, from the kiln or kiln car on removal from the kiln and loaded directly on a transfer vehicle and delivered in stack form as received from the kiln to a brickyard or building site at any distance from the kiln. This not only ensures the consignee of the receipt of a full order of brick in good condition, but also relieves the carrier from claims for damages due to brick shipped under ordinary conditions. In shipping commodities other than brick which are required to be protected to some extent from weather conditions, covers may be employed to close the open tops of the containers and other provision may be made if required, to close the open fronts of the containers during shipment.

The fork C, employed in the loading and unloading operations may be of any suitable and approved construction, that shown in the present instance being conventionally illustrated as comprising a body F adapted to bear against one side of the stack of brick to support the stack, and carrying a plurality of pivotally mounted fork arms $f$ adapted to slide into the space or guideways between the container cleats $a^8$ and to be actuated to move them into and out of position for stack engaging and releasing operations by means of controlling mechanism, not necessary to be herein described.

In the shipment of brick it has been found satisfactory and economical to employ a container car of standard width and of a length of approximately forty-six feet, which provides for the reception of twenty-two containers properly dimensioned to each hold a stack or unit of 1500 bricks, allowing a shipment of 33,000 bricks to be made on a container car of such size. It will be understood that while in the present disclosure the containers are constructed, arranged and proportioned so as to require the removal of two containers from the container car in order to allow shifting of the remaining containers for loading and unloading operations, it is conceivably possible to so construct, arrange and proportion the containers that the removal of but a single container will be required for the purpose. It is also to be understood that while the car, containers and fork structure shown for the purpose are preferred, particularly in the shipment of brick, I do not limit my invention thereto, as changes in the form, construction and arrangement of the parts may be made within the scope of the appended claims without departing from the spirit or sacrificing any of the advantages of the invention.

What I claim is:—

1. The method of loading unit stacks of piled articles of a predetermined number of articles to a pile for transport, which consists in assembling unit containers, each having an open side and an open top, on a carrier vehicle so as to normally substantially fill a container receiving space of said vehicle and so that the open side of each container will be closed, removing from the vehicle at least one of the containers so as to provide a loading space communicating with the open side of a remaining container, introducing through said space into said container whose open side is exposed, a stack unit, then shifting said remaining containers on the vehicle to similarly provide loading spaces and expose the open sides of the containers in a determined order and loading them with stack units, and loading and replacing the removed container so that at the end of the final loading operation the container receiving space of the vehicle will be filled and the open sides of the loaded containers closed.

2. The method of loading unit stacks of piled articles of a predetermined number of articles to a pile for transport, which consists in assembling unit containers, each having an open side and an open top on a carrier vehicle and in rows arranged on opposite sides of the longitudinal center of the vehicle, with the containers of one row extending longitudinally and the containers of the other row extending transversely of the vehicle and so that the open side of each container will be closed by an adjacent container or containers, removing from the vehicle at least one of the transversely disposed containers so as to provide a loading space communicating with the open side of an adjacent container, introducing through said space into said container a stack unit, then shifting the remaining containers in the second-named row to similarly provide loading spaces and expose the open sides of the containers of both rows in a determined order and loading the exposed containers successively with stack units, and loading and replacing the removed container so that at the end of the final loading operation the container receiving space of the vehicle will be filled and the open sides of the load containers closed.

3. The method of loading unit stacks of piled articles of a predetermined number of articles to a pile for transport on a carrier vehicle, which consists in assembling unit containers, each having an open side and an open top, on the carrier vehicle in rows located on opposite sides of the longitudinal center of the vehicle with the containers of one row extending longitudinally of the vehicle and the containers of the other row extending transversely of the vehicle and so that the open side of each container will be closed by an adjacent container or containers, removing from the vehicle a plurality of transversely disposed containers so as to provide a loading space through which the open side of one or more of the longitudinally and transversely extending containers are exposed, introducing stack units into the exposed containers through said loading space, then shifting the remaining transversely disposed containers on the vehicle so as to provide loading spaces and expose the open sides of the remaining longitudinally and transversely disposed containers on the vehicle and loading them with stack units in a determined order until a predetermined number of the units on the vehicle are loaded, and then loading the removed containers of stack units and replacing said removed containers on the car so that at the end of the final loading operation the container receiving space of the vehicle will be filled and the open sides of the containers closed.

4. The method of loading unit stacks of piled articles of a predetermined number of articles to a pile on a transport vehicle, which consists in assembling unit containers, each having an open side and an open top, on the vehicle in two rows so as to normally fill a container receiving space of said vehicle and so that the open side of each container will be closed by an adjacent container or containers, removing from the vehicle at least one of the containers of one of the rows so as to provide a loading space communicating with an open side of a container of the other row, introducing through said space into said exposed container a stack unit, then shifting the remaining containers of the first-named row in a predetermined order to provide loading spaces, exposing the open sides of the containers of the rows and loading the containers with stack units as exposed, and loading and replacing the removed container or containers so that at the end of the final loading operation the container receiving space of the vehicle will be filled and the open sides of the containers closed.

5. The method of loading unit stacks of piled articles of a predetermined number of articles to a pile on a container car carrying individual load receiving containers, which consists in assembling on the car unit containers, each having an open side and an open top, arranged in rows on opposite sides of the longitudinal center of the car with the containers of one row extending longitudinally of the car and the containers of the other row extending transversely of the car and so that the open side of each container is closed by an adjacent container or containers, removing from the car at least one of the transversely disposed containers so as to provide a loading space communicating with the open side of a longitudinally extending container and one or more of the remaining transversely disposed containers, introducing stack units into the exposed containers through the loading space, shifting the remaining transversely disposed containers on the vehicle to similarly provide loading spaces and expose the open sides of the containers of both rows in a determined order and loading them as exposed with stack units, and loading and replacing the removed container or containers so that at the end of the final loading operation the container receiving space of the vehicle will be filled and the open sides of the loaded containers closed.

6. The method of loading, transporting and unloading unit stacks of piled articles of a predetermined number of articles to a pile for transport, which consists in assembling unit containers, each having an open side and an open top, on a carrier vehicle so as to normally substantially fill the container receiving space of the vehicle and so that the open sides of the containers are closed by an adjacent container or containers, removing from the vehicle at least one of the containers so as to provide a loading space communicating with the open side of an adjacent container, disposing a stack unit on a loading fork and introducing the unit into the exposed container by said fork through said loading space, shifting the containers on the car so as to provide loading spaces and expose the open sides of the remaining containers and filling and loading them with units in a like manner in a predetermined order, loading the removed container or containers and replacing the same on the vehicle, transporting the vehicle from the loading point to a destination point, removing one or more of the containers from the vehicle to provide an unloading space, removing by means of an unloading fork a unit from a container exposed by said space, and then shifting the containers to expose the units therein and unloading them from the containers in a predetermined order.

7. The method of loading and transporting materials, which consists in assembling individual containers, each having an open top and an open side, in a receiving space on a carrier vehicle so that said space is substantially filled thereby and the open sides of the containers closed, removing from the vehicle at least one container so as to provide a loading space and expose therethrough the open side of one or more of the remaining containers, filling the exposed containers through said loading space and exposed open sides, relatively shifting the containers so as to provide loading spaces and successively expose the open sides of said remaining containers, similarly loading the exposed containers, loading the removed container, and replacing the loaded removed container on the vehicle so that the container receiving space will be filled and the open sides of the containers closed.

GRAHAM C. WOODRUFF.